US006201836B1

United States Patent
Kim

(10) Patent No.: US 6,201,836 B1
(45) Date of Patent: Mar. 13, 2001

(54) METHOD AND APPARATUS FOR COMBINING A TRELLIS CODING SCHEME WITH A PRE-CODING SCHEME FOR DATA SIGNALS

(75) Inventor: Dae-Young Kim, Lexington, MA (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/234,451

(22) Filed: Jan. 20, 1999

(51) Int. Cl.$^7$ ....................................... H04L 5/12
(52) U.S. Cl. ............................................... 375/265
(58) Field of Search .................... 375/265, 295; 714/792, 786

(56) References Cited

U.S. PATENT DOCUMENTS

| 5,199,046 | 3/1993 | Ling ..................................... 375/222 |
| 5,488,633 | 1/1996 | Laroia .................................. 375/262 |

OTHER PUBLICATIONS

L.F. Wei; "Trellis–Coded Modulation with Multidimensional Constellations" IEEE Trans. On Information Theory, vol. 33, No. 4, Jul. 1987.

N. Al–Dhahir, et al. "Efficient Computation of the Delay Optimized Finite Length MMSE–DFE" IEEE Transactions on Signal Processing; vol. 44, No. 5, May 1996, pp. 1288–1292.

ITU–T Blue Book; "Pulse Code Modulation (PCM) of Voice Frequencies"; ITU–T Recommendation G.711; 1993.

V.34 Standard.

R. Laroia, "Coding for Intersymbol Interference Channels—Combined Coding and Precoding", IEEE Trans. on Information Theory, vol. 42, No. 4, Jul. 1996, pp. 1053–1061.

*Primary Examiner*—Temesghen Ghebretinsae
(74) *Attorney, Agent, or Firm*—Joanne N. Pappas

(57) ABSTRACT

A system (180) receives input bits from a user. From the input bits, an equivalence class is defined which has at least one constellation point. One of the constellation points in the equivalence class is chosen to represent an output of a channel. A redundancy bit is calculated from the output of the channel and is used to define a next equivalence class for the system (180).

19 Claims, 5 Drawing Sheets

METHOD AND APPARATUS FOR COMBINING A TRELLIS CODING SCHEME WITH A PRE-CODING SCHEME FOR DATA SIGNALS

FIELD OF THE INVENTION

The present invention relates to a method and apparatus for combining a Trellis coding scheme with a pre-coding scheme for data signals.

BACKGROUND OF THE INVENTION

FIG. 1 illustrates how V.34 modems combine a pre-coding scheme with a four-dimensional Trellis coding scheme. As shown in FIG. 1, only the signal y(n), not u(n), must have Trellis code properties (i.e., y(n) should be Trellis code sequence) since it is the signal received by the receiver and decoded by the Trellis decoder. V.34 modems make y(n) to be a Trellis code sequence by making sure that u(n) is a Trellis sequence and u(n) (precoder input) and y(n) (precoder output) is in the same four-dimensional (4D) family as defined in L. F. Wei, "Trellis-Coded modulation with Multidimensional Constellations," IEEE Trans. on Information Theory, vol. 33, no. 4, July 1987. As long as u(n) and y(n) are in the same four-dimensional family, making u(n) a Trellis sequence guarantees that y(n) is also a trellis sequence.

Current state-of-the-art V.90 modems use a faster (56 kbps) pulse code modulation (PCM) coding scheme for downstream transmission and the slower (33.6 kbps) V.34 coding scheme for upstream transmissions. Upstream PCM transmission would employ a different pre-coding scheme, and therefore the technique used for V.34 can no longer be used.

Thus, a need exists for a method and apparatus for combining a Trellis coding scheme with a pulse code modulation transmission for lower error probability at a given upstream transmission rate.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

A method and apparatus for combining a Trellis coding scheme (e.g., four-dimensional) with pulse code modulation (PCM) transmission (hereinafter referred to as "pre-coding"; e.g., one-dimensional) for faster upstream transmission rates is described herein. The preferred embodiment of the present invention imposes a set of constraints in the selection of an equivalence class in order to combine a Trellis coding scheme with the pre-coding scheme. An equivalence class is a set of typically two or more constellation points that represent the same group of bits or digital data to be transmitted. The present invention defines the equivalence class based on a redundancy bit generated for each one or multi-dimensional symbols.

Figure 1:
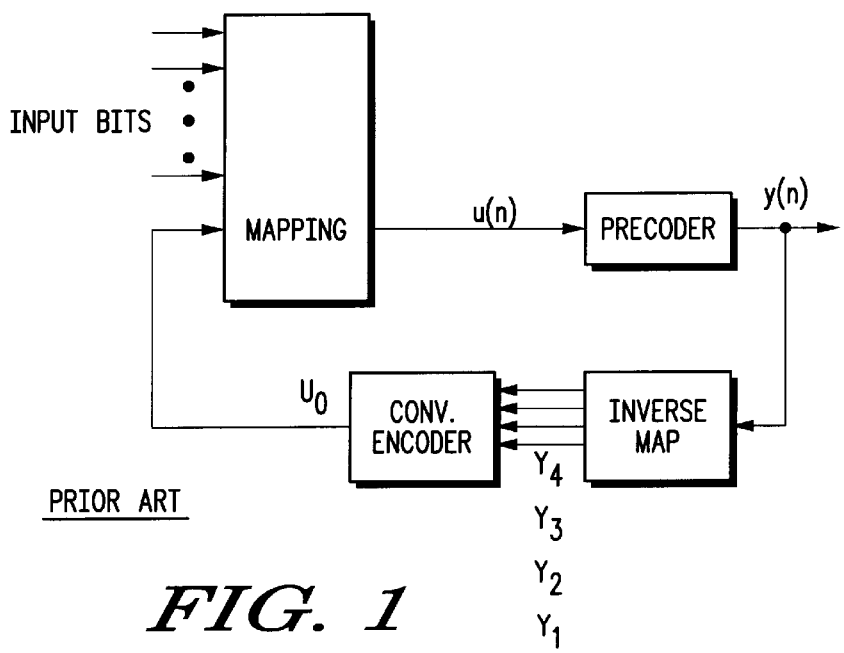
FIG. 1 (prior art) illustrates a block diagram of a V.34 modem combining pre-coding with Trellis coding.
Figure 2:
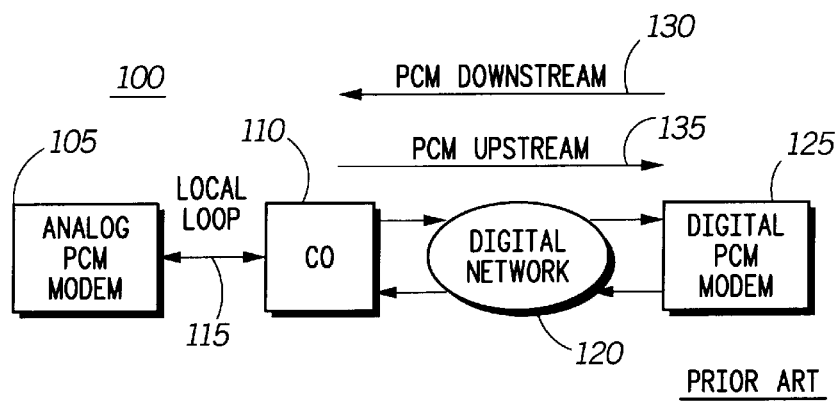
FIG. 2 (prior art) illustrates a block diagram of a typical analog pulse code modulation (PCM) modem to digital PCM modem communication system.

There is shown in FIG. 2, a typical PCM communication system 100. System 100 includes an analog PCM modem 105 connected to a telephone company's central office (CO) 110 over a local analog loop or channel 115. The system 100 also includes a digital network 120 that is interconnected to the CO 110 and to a digital PCM modem 125. With this system 100, PCM data is transmitted both in the downstream direction 130 (i.e., from the digital PCM modem 125 to the analog PCM modem 105) and in the upstream direction 135 (i.e., from the analog PCM modem 105 to the digital PCM modem 125). This type of bi-directional PCM communication system is described in U.S. application Ser. No. 08/724,491, entitled Hybrid Digital/Analog Communication Device, which is assigned to the assignee of the present invention and which is incorporated herein in its entirety by reference.

Figure 3:
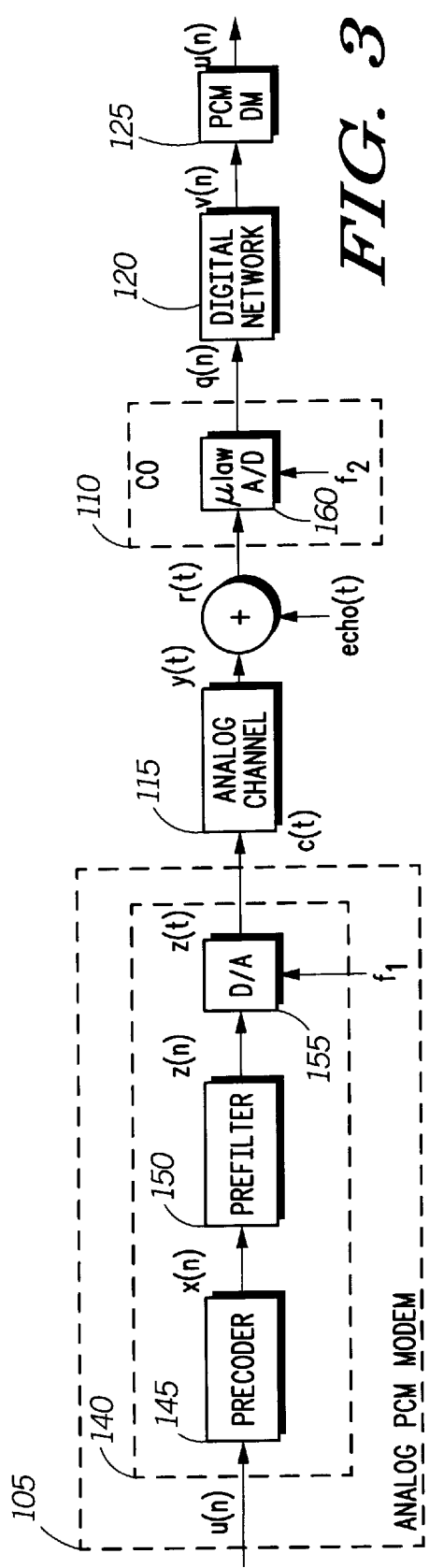
FIG. 3 illustrates a block diagram depicting a PCM upstream transmission.

FIG. 3 is an example of a PCM upstream transmission 135. In FIG. 3, the analog PCM modem 105 is interconnected to the analog channel 115. The analog PCM modem 105 includes a transmitter 140 having a precoder 145, a prefilter 150 and a digital-to-analog converter (D/A) 155. The precoder 145 receives digital data u(n) and outputs precoded digital data signal x(n). The precoded digital data signal, which is provided to the D/A 155, is filtered by the prefilter 150 to form signal z(n). The D/A 155 converts the filtered signal z(n) to analog form and transmits the analog signal, z(t), over the analog channel 115, having a channel characteristic, c(t).

The analog channel 115 modifies the transmitted signal z(t) to form signal y(t). The signal y(t) then encounters downstream PCM echo, echo(t), which is added to y(t), thus producing signal r(t). Signal r(t) is received by a μlaw (A-law in some countries outside of the U.S.) quantizer 160 in the CO 110 and is quantized according to the Flaw as described in the International Telecommunications Union, Recommendation G.711, Pulse Code Modulation (PCM) of Voice Frequencies, 1972, which is incorporated herein by reference in its entirety.

The quantized octets (digital values), q(n), are transmitted over the digital network 120 at a frequency of eight (8) kHz where they may be affected by various digital impairments.

The possibly affected octets, v(n), are received by the digital PCM modem 125 which ideally decodes the octets, v(n), into their corresponding constellation points, y(t), from which the original digital data, u(n), is recovered. As will be appreciated by those skilled in the art, the decoding of v(n) may can be accomplished in a number of ways, several of which are known in the art and will not therefore be detailed herein.

Before data is transmitted upstream 135, the clock (f1) of the D/A 155 in the analog PCM modem 105 is synchronized to the clock (f2) of the A/D 160 in the CO 110. This is achieved by learning the clock from the downstream PCM signal (not shown) and synchronizing the clocks (f1 and f2) using the technique proposed in U.S. Pat. No. 5,199,046, entitled First and Second Digital Rate Converter Synchronization Device and Method, incorporated herein by reference in its entirety. Once the clocks (f1 and f2) are synchronized, FIG. 3 is represented as an equivalent discrete time block diagram as shown in FIG. 4.

Figure 4:
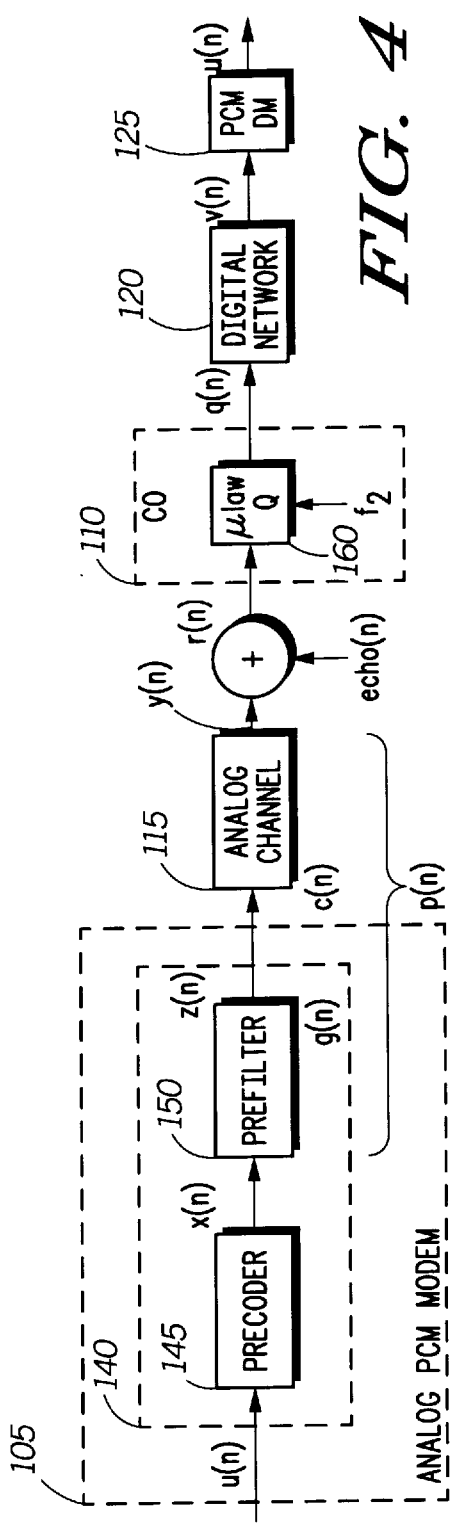
FIG. 4 illustrates an equivalent discrete time block of the block diagram of FIG. 3.

In FIG. 4, it is assumed that clock (f1) is equal to clock (f2). It should be noted, however, that clock (f1) does not have to be equal to clock (f2) as long as the two clocks (f1 and f2) are synchronized. When clock (f1) is equal to clock (f2), n is the time index for eight (8) kHz samples, since clock (f2) of the CO 110 is fixed at that frequency.

The precoder 145 and the prefilter 150 are designed to transmit signal z(n) over the analog channel 115 such that predetermined constellation points, y(n), corresponding to the digital data u(n) are produced at the input of the flaw quantizer 160 (in combination with an echo component, echo(n), if present). In other words, the input of the µlaw quantizer 160 is y(n)+e(n) in the presence of echo(n) and just y(n) in the absence of echo(n).

By using the PCM upstream pre-coding technique described below, or any other pre-coding technique, it is difficult for the digital PCM modem 125 to accurately decode u(n) from v(n) in the presence of echo, quantization and digital impairments without a properly designed transmit constellation of points, y(n). The present invention assumes that a properly designed transmit constellation of points y(n) is achieved in order to enable y(n) (and eventually u(n) from v(n)) to be decoded in the presence of echo, quantization and digital impairments with minimized error probability. In other words, the prefilter 150 seeks to transmit a signal z(n) that, after distortion by the channel 115, will result in the desired signal y(n).

Figure 5:
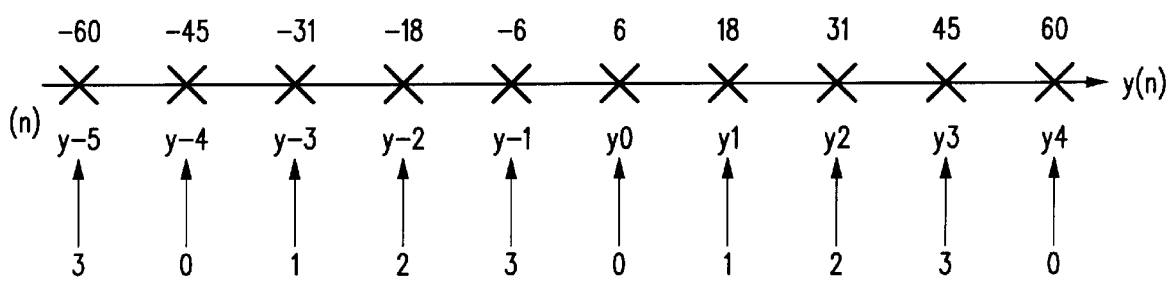
FIG. 5 illustrates an example of a transmit constellation having equivalence classes.

In accordance with the present invention, for a given connection, depending on the line conditions, a transmit constellation for each robbed bit signaling (RBS) time slot is selected. As an example, transmit constellation is depicted in FIG. 5. This constellation includes ten constellation points, $y_{-5}$ to $y_4$, ranging in value from –60 to 60. It should be noted that the constellation points, y(n), are not necessarily G.711 µlaw levels. The constellation points, y(n), correspond to digital data to be transmitted, u(n). In other words, each constellation point, y(n), represents a group of data bits and the number of data bits represented by each constellation point depends on the number of points in the constellation (and the number of equivalence classes, which are described below). The more points in the constellation, the more bits of data that can be represented. For example, as shown in FIG. 5, digital data u(n) is divided into four groups of bits (0, 1, 2 and 3) that corresponds to (00, 01, 10 and 11). Thus, in this example, each constellation point transmitted represents two bits and since the constellation points are transmitted at eight (8) k/sec, the data rate is sixteen (16) kilobits per second. It must be understood that this is a simplified example and data may be mapped into u(n) using any mapping schemes that can map bits into equivalence classes, such as shell mapping or modulus conversion.

According to the preferred embodiment of the present invention, the constellation points are grouped into equivalence classes. As stated above, an equivalence class is a set of typically two or more constellation points that represent the same group of bits or digital data to be transmitted, u(n) (although it may be noted that some equivalence classes may comprise a single constellation point). With a constellation, it is shown that constellation points $y_{-4}(-45)$, $y_0(6)$, and $y_4(60)$ form the equivalence class for u(n)=0. Constellation points $y_{-3}(-31)$ and $y_1(18)$ form the equivalence class for u(n)=1 and constellation points $Y_{-2}(-18)$ and $y_2(31)$ form the equivalence class for u(n)=2. Finally, constellation points $y_{-5}(-60)$, $y_{-1}(-6)$ and $y_3(45)$ form the equivalence class for u(n)=3.

Equivalence class selection is generally accomplished as follows. The constellation, with M points (assuming M is even), is indexed as $y_{-M/2}$, $y_{-M/2}+1$, ... $y_{M/2-1}$ in ascending (or descending) order. Assuming u(n) has U values, e.g., U=4 as in the above example, then the equivalence classes for u(n)=u contains all the $y_k$'s, where k modulo U is u. For example, in FIG. 5, the equivalence class for u(n)=0 is $y_{-U}$, $y_0$ and $y_U$, where U=4. Note that each equivalence class is not required to have the same number of constellation points.

The number of supporting data levels for u(n) should be chosen to satisfy the following two conditions: 1) the expansion ratio, which is defined as the ratio between the number of constellation points for y(n) and the number of supporting data levels for u(n), i.e., M/U; and 2) the transmit (TX) power constraints.

As described below, the precoder 145 selects the appropriate constellation point, $y_k$, from the equivalence class for the data, u(n), to be transmitted and determines a value for x(n) that will produce the selected constellation point at the input to µlaw quantizer 160.

The pre-coding scheme, i.e., the design of the precoder 145 and the prefilter 150, are now described as follows. From the characteristics of the analog channel, c(n), n=0, 1, ... Nc–1, determined by the digital PCM modem 125, as described in co-pending application Ser. No. 08/999,416 entitled Device and Method for Detecting PCM Upstream Digital Impairments in a Communication Network, which is assigned to the assignee of the present invention and which is incorporated herein in its entirety by reference, an optimal target response p(n), n=0, 1, ... Np–1, and corresponding prefilter g(n), n=–D, –D+1, ... , –D+Ng–1(where D is the decision delay), as shown in FIG. 4, are determined. This problem is similar to determining the optimal feed-forward and feedback filters for a decision feedback equalizer (DFE). The prefilter 150 corresponds to the feed-forward filter of the DFE, and the target response corresponds to the feedback filter of the DFE as described in N. Al-Dhahir, et al, "Efficient Computation of the Delay Optimized Finite Length MMSE-DFE", IEEE Transactions On Signal Processing, vol. 44, no. 5, May 1996, pp. 1288–1292, which is incorporated herein by reference. Preferably, the target response, p(n), and the prefilter, g(n), 150 will be determined in the analog PCM modem 105, but they can be determined in the digital PCM modem 125 and transmitted to the analog PCM modem 105.

The prefilter g(n) 150, n=–D,–D+1, ... , –D+$N_g$–1, and the target response p(n), n=0,1, ... , $N_p$–1, (where p(0)=1) can be derived given c(n) by minimizing the cost function z as follows:

$$\zeta = \|g(n)*c(n)-p(n)\|^2 + \alpha\|g(n)\|^2 \quad (1)$$

The first term ensures small inter-symbol interference (ISI), i.e., the receiver of the digital PCM modem 125 receives what the precoder 145 tried to encode, and the second term enforces the TX power to stay finite and small. The term "α" is a constant term that should be chosen depending on the application. The larger "α" is, the lower the TX power will be, but at the expense of ISI. A smaller "α" gives less ISI at the expense of TX power. Therefore, "α" should be chosen depending on what is desired for the ISI and the TX power for a given application.

Once the target response, p(n), is determined, the precoder 145 is implemented. As explained above, data u(n) is sent by transmitting x(n) such as to produce at the input to the μlaw quantizer 160, FIG. 4, a constellation point y(n) that is one of the points in the equivalence class of u(n). Which constellation point from the equivalence class of u(n) to use to represent u(n) is usually selected to minimize the TX power of transmitter. The TX power of the transmitter is the power of z(n) (or some other metric). In practice, since it is difficult to minimize the power of z(n), the power of x(n) is minimized instead, which is a close approximation of minimizing the power of z(n).

The following is a known relationship among x(n), y(n) and p(n):

$$y(n) = p(n)*x(n) \quad (2)$$

where "*" represents convolution. That relationship can be expressed as follows:

$$y(n) = p(0)x(n) + p(1)x(n-1) + \ldots p(N_p)x(n-N_p) \quad (3)$$

Since p(0) is designed to be equal to 1, equation (3) can be simplified as follows:

$$x(n) = y(n) - \sum_{i=1}^{N_p} p(i)x(n-i) \quad (4)$$

And, since p(n) and the past values of x(n) are known, the appropriate y(n), among the constellation points of the equivalence class of a given u(n), may be selected to minimize $x^2(n)$ in order to minimize the TX power of the transmitter.

Figure 6:
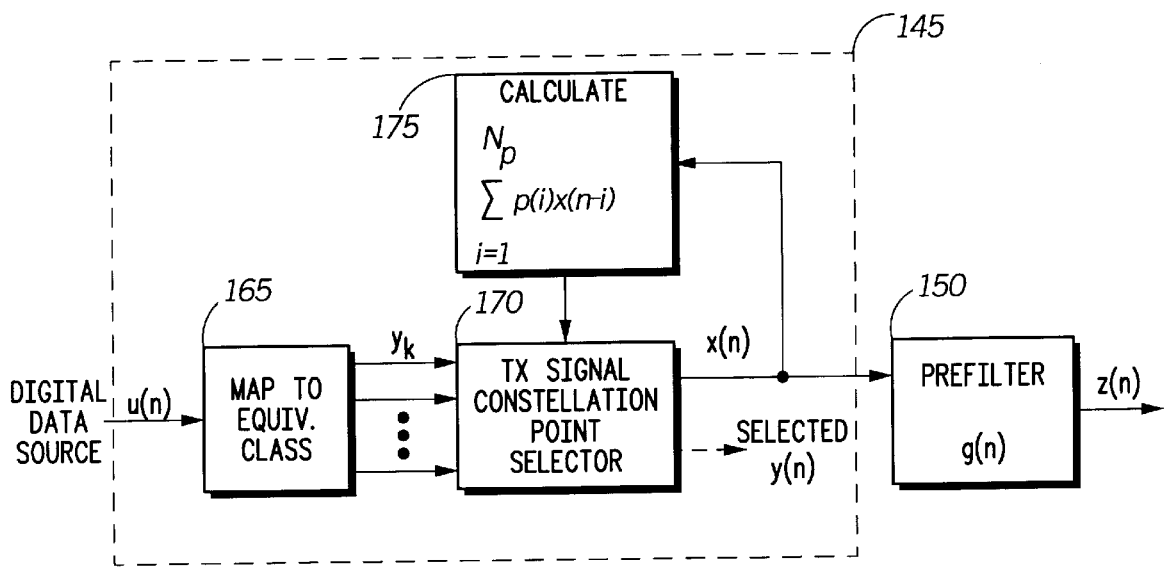
FIG. 6 illustrates a block diagram of an analog PCM transmitter of FIG. 4.

The precoder 145 may be implemented as depicted in FIG. 6. The precoder 145 includes a mapping device 165 which receives the incoming digital data u(n) from a digital data source and, depending on the number of bits that can be transmitted with each constellation point, determines for each group of bits the equivalence class associated with the group of bits. The mapping device 165 outputs the constellation points, $y_k$, forming the equivalence class to TX signal/constellation point selector 170 which selects the constellation point, $y_k$, from the equivalence class and determines the transmit signal x(n) based on an input from a calculation device 175.

The filter device 150 receives the transmit signal, x(n), and calculates the summation term (or running filter sum (RFS)) of equation (4) above. Based on the value of the RFS, the TX signal/constellation point selector 170 selects the constellation point in the equivalence class that will cause x(n) in equation (4) to be closest in value to zero and calculates the value of x(n) from the calculated RFS and the selected constellation point. The calculated transmit signal x(n) is then provided to the prefilter 150 where x(n) is filtered to form signal z(n) which is transmitted over the analog channel 115 (as shown in FIG. 4).

The example described above is for an uncoded system. The principles, however, can be extended to a coded system, e.g., a Trellis coded system. In a coded system, the equivalence classes must be carefully defined to be compatible with the Trellis coding scheme. Therefore, the equivalence classes should be defined in conjunction with the Trellis code. The preferred embodiment of the present invention shows how to define the equivalence classes by combining the Trellis coding system with PCM transmission for lower error probability at a given upstream transmission rate. This, in effect, provides a higher data rate for the same error rate.

Figure 7:
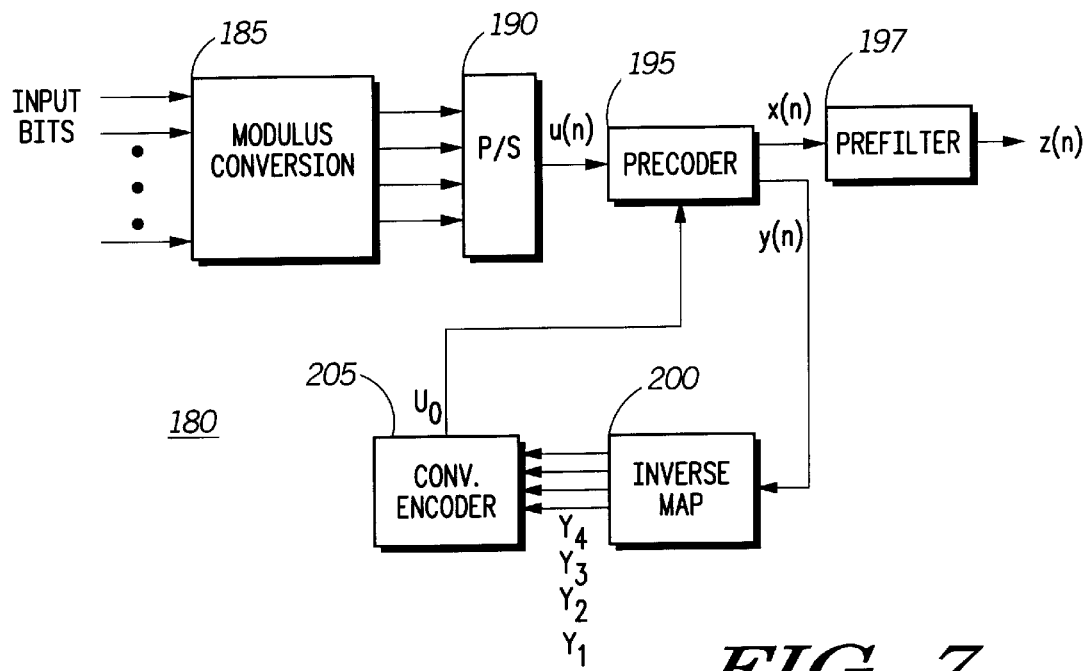
FIG. 7 illustrates a block diagram of a system according to the preferred embodiment of the present invention.

FIG. 7 illustrates a block diagram of a preferred system 180 according to the preferred embodiment of the present invention. The explanation will be based on one-dimensional pre-coding and 4-dimensional Wei Trellis Coding defined in L. F. Wei, "*Trellis-Coded modulation with Multidimensional Constellations*," IEEE Trans. on Information Theory, vol. 33, no. 4, July 1987, which is incorporated herein by reference in its entirety. The system 180 comprises a mapping scheme 185, a parallel-to-serial port 190, a precoder 195, a prefilter 197 an inverse map converter 200 and a convolutional encoder 205. The mapping scheme 185 is coupled to at least one input port to receive user data (e.g., input bits). The parallel-to-serial port 190 is coupled to an output(s) of the mapping scheme 185. The precoder 195 is coupled to an output (e.g., u(n)) of the parallel-to-serial port 190 and to an output (e.g., U0) of the convolutional encoder 205. The prefilter 197 is coupled to an output (i.e., x(n)) of precoder 195. The inverse map converter 200 is coupled to an output (e.g., y(n)) of the precoder 195. The signal y(n) is the ideal signal at the receiver after distortion by the transmitter-receiver channel. The convolutional encoder 205 is coupled to an output(s) (e.g., Y4, Y3, Y2 and Y1) of the inverse map converter 200.

In operation, u(n) is generated from user data/input bits using the mapping scheme 185. The mapping scheme 185 can be any scheme that converts user data/input bits into multi-dimensional numbers. For ease of explanation, the mapping scheme 185 in the preferred embodiment is a Modulus conversion (which is used in ITU V.90 standard) employing a four-symbol frame. It should be noted that Modulus conversion 185 does not have to employ a four-symbol frame. Modulus conversion 185 based on a six-symbol frame can be employed instead of the four-symbol frame for a four-dimensional family. If the six-symbol frame is employed, Modulus conversion 185 will produce six outputs: four modulo converted numbers for the current four-dimensional frame and the remaining two modulus converted numbers to the next four-dimensional frame. For purposes of the preferred embodiment, the user data/input bits are converted into four modulo converted numbers by the Modulus conversion 185 because the preferred embodiment is described in conjunction with a four-dimensional trellis encoder.

The modulus converted numbers generated from the Modulus conversion 185 are fed in the parallel-to-serial port 190 in a parallel fashion, and outputted in a serial fashion to generate u(n). u(n) is fed into the precoder 195 in a serial fashion.

Figure 8:
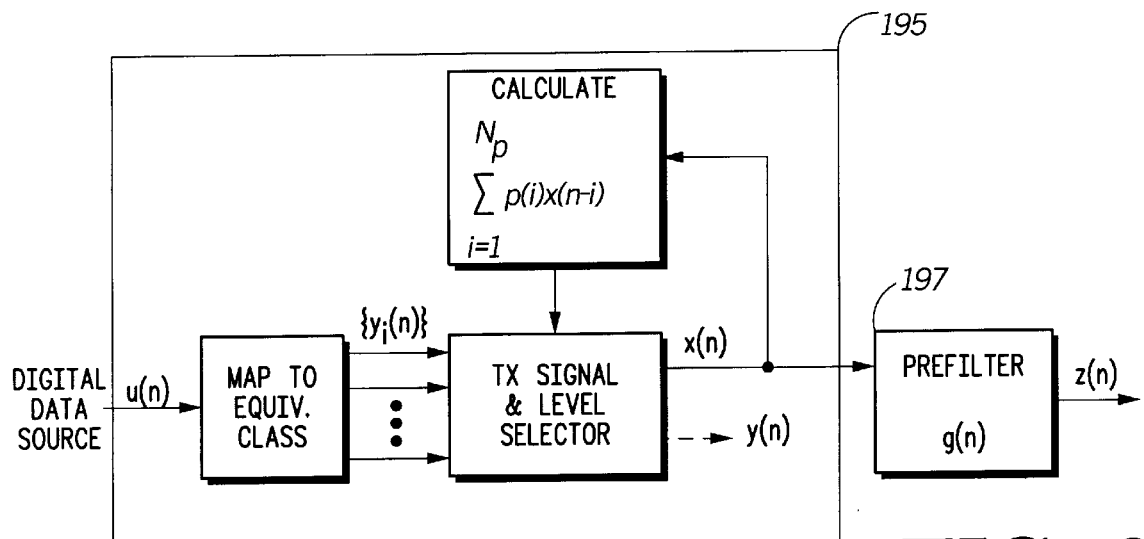
FIG. 8 illustrates a block diagram of an analog PCM transmitter of FIG. 7.
Figure 9:
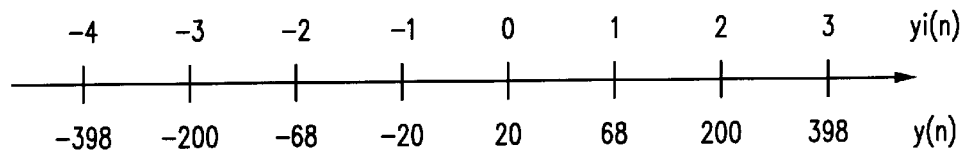
FIG. 9 illustrates a one-dimensional constellation diagram according to the preferred embodiment of the present invention.

From u(n), {yi(n)} is generated, which is an equivalence class of u(n) (as shown in FIG. 8). The equivalence class is defined at the output of the channel. By having multiple points in the equivalence class, it is possible to equalize the channel by choosing one of those points. Since the preferred embodiment employs a four-symbol frame, every four symbols has its own equivalence class. Thus, an equivalence class is applied to a set of four symbols, and a next equivalence classes is generated and applied to a next set of four symbols, and so on. Among these equivalence class elements, a yi(n) is chosen which minimizes the transmit power (i.e., power of x(n)). It should be noted that yi(n) is used as an index for y(n). y(n) is a linear value (i.e., proportional to actual channel output voltage) and yi(n) is the index for that linear value. As shown in FIG. 9, yi(n)=0 is used for smallest positive points in y(n), yi(n)=1 is used for the next positive points, and so on. yi(n)=−1 is used for the negative point with smallest absolute value. yi(n)=−2 is used for the negative point with second smallest absolute value, and so on.

For each four-dimensional symbol, the first three precoder outputs (i.e., y(4k+0,1,2)) are chosen from u(4k+0, 1,2) as was done when there is no Trellis coding. The fourth precoder output (i.e., y(4k+3)), however, is chosen to satisfy a four-dimensional family constraint specified by generating a redundancy bit, U0. A single redundancy bit, U0, is generated for each set of four symbols. In order to make y(n) a Trellis code sequence, the four-dimension family constraint must be satisfied: when the redundancy bit, U0, is equal to zero (0), y(n) must be chosen from an even four-dimensional family; and when the redundancy bit, U0, is equal to one (1), y(n) must be chosen from an odd four-dimensional family. An even four-dimensional family is defined as the four-dimensional point whose sum is even. For example, (0, 2, −1, 5) is in even four-dimensional family since its sum is six. An odd four-dimensional family is defined as the four-dimensional point whose sum is odd. Redundancy prevents the precoder 195 from freely choosing a point on the constellation, but rather limits the precoder 195 to choosing a point on the constellation under the constraint imposed by the redundancy bit, U0, stated above. The redundancy bit, U0, is not transmitted, but rather used to determine the equivalence class.

The significance of the constraints imposed by the redundancy bit, U0, is that in Trellis coding, the next symbol is dependent on the previous symbol, thus making decoding more reliable. For example, when four-dimensional points are received by the precoder 195, there is a high chance that the precoder 195 will miss detect an even four-dimensional family from a odd four-dimensional family (e.g., if the even four-dimensional family is (0,0,0,0) and the odd four-dimensional family is (0,0,0,1), noise could be present which could distort, for example, the last point ("0") in the equivalence class to be read as a ("1")). The constraints imposed above, however, allows the receiver (not shown) to know the value of the redundancy bit, U0, thus implicitly informing the receiver of the type of four-dimensional family it can accept. For example, if the receiver knows the redundancy bit, U0, is equal to zero (0), then the receiver will only accept an even four-dimensional family. In this example, it is preferred that all of the points in the equivalence class satisfy the constraint. Thus if the redundancy bit, U0, is zero, all values of y(n) should be from an even four-dimensional family (and vice versa). Otherwise, only a subset of the equivalence class could be used and this is unacceptable.

To illustrate further mathematically, assume $0<=u(4k+i)<=M_i-1$, $$\{yi(4k+i)\}=\{u(4k+i)+c*M_i\}, \text{ where } i=0, 1 \text{ and } 2; \quad (5)$$

and $$\{yi(4k+3)\}=\{2u(4k+3)+2c*M_3+((yi(4k)+yi(4k+1)+yi(4k+2)+U_0)\text{mod } 2), \quad (6)$$

where c is an integer. It should be noted that the equivalence class of time 4k+3 changes according to previous coded outputs yi(4k+i), where i=0, 1 and 2. Equation (6) guarantees that y(n) is a valid Trellis coding sequence that satisfies U0 constraint. This can be easily seen that if U0=0, the sum of yi(4k+i), i=0,1,2,3 is even and if U0=1, the sum of yi(4k+i), i=0, 1, 2, 3 is odd.

The following discussion is an example of how an equivalence class is selected. It is assumed that all the time slots use the same constellation with 2K points which are indexed as yi=−K, −(K−1), . . . ,−1, 0, 1, . . . K−1. Assuming u(4k+i), i=0, 1, 2 has M values and u(4k+3) has V values, then the equivalence class for u(4k+i)=u, i=0, 1, 2 contains all the yi's where yi modulo U is u. For example (assuming M=4, V=2, and K=10), the equivalence class for u(4k)=0 is {−4, 0, 4}. The same rule applies for the equivalence classes of u(4k+1) and u(4k+2). The equivalence class of u(4k+3), however, is chosen differently. Note that each equivalence class is not required to have the same number of constellation points. As an example, lets assume yi(4k+0)=−5, yi(4k+1)=2, yi(4k+2)=0, V=2, K=10, and U0=0, then as derived from Equation (6), the equivalence class for u(4k+3)=1 is $$\{2+2c*M_3+((yi(4k)+yi(4k+1)+yi(4k+2)+U_0)\text{mod } 2)\}, \text{ where } c \text{ is an integer} \quad (7)$$

$$=\{2+2cV+(-5+2+0+0)\text{mod}2\}, \text{ where } c \text{ is an integer} \quad (8)$$

$$=\{2+4c+1\}=\{-5,-1,3\} \quad (9)$$

Figure 10:
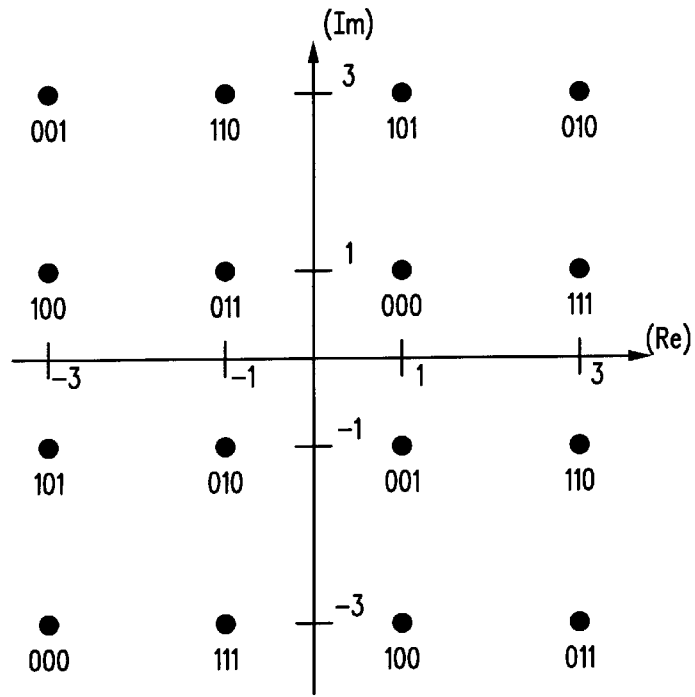
FIG. 10 (prior art) illustrates labeling of indices pairs (W0, W1) or (W2, W3)

The inverse map converter 200 does the same operation with that of V.34 modems. The inverse map converter 200 receives y(n) as an input and generates four bits (e.g., Y4, Y3, Y2, and Y1). Received index yi(4k+i) is converted to index Wi according to Wi=2y(4k+i)+1. Indices W0, W1 form a complex pair (W0, W1) and indices W2, W3 form the complex pair (W2, W3) that positions on a two-dimensional rectangular grid with odd-integer coordinates. A three-bit subset label in an eight-way set partitioning represents points on the grid. The labeling of points is shown in FIG. 10 for a small subset of the points near the origin. Two pairs (W0, W1) and (W2, W3) are used to generate two subset labels S0 and S1, respectively, which are converted into four input bits [Y4, Y3, Y2, Y1] for the convolutional encoder 205 according to Table 1 below:

TABLE 1

Table for Y4, Y3, Y2, Y1

| S0 | \multicolumn{8}{c}{S1} |
|---|---|---|---|---|---|---|---|---|
| | 000 | 001 | 010 | 011 | 100 | 101 | 110 | 111 |
| 000 | 0000 | 0000 | 0001 | 0001 | 1000 | 1000 | 1001 | 1001 |
| 001 | 0011 | 0010 | 0010 | 0011 | 1011 | 1010 | 1010 | 1011 |
| 010 | 0101 | 0101 | 0100 | 0100 | 1101 | 1101 | 1100 | 1100 |
| 011 | 0110 | 0111 | 0111 | 0110 | 1110 | 1111 | 1111 | 1110 |
| 100 | 1000 | 1000 | 1001 | 1001 | 0000 | 0000 | 0001 | 0001 |
| 101 | 1011 | 1010 | 1010 | 1011 | 0011 | 0010 | 0010 | 0011 |
| 110 | 1101 | 1101 | 1100 | 1100 | 0101 | 0101 | 0100 | 0100 |
| 111 | 1110 | 1111 | 1111 | 1110 | 0110 | 0111 | 0111 | 0110 |

Figure 11:
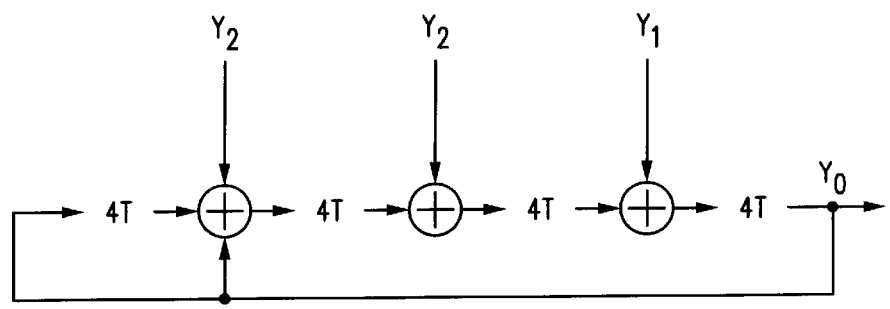
FIG. 11 (prior art) illustrates a sixteen (16) state convolution encoder according to the preferred embodiment of the present invention.
Figure 12:
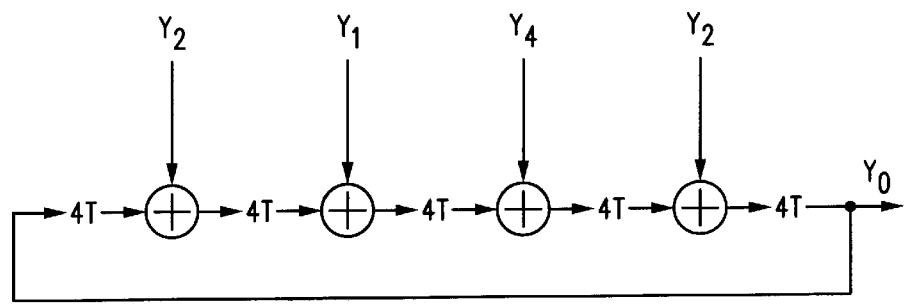
FIG. 12 (prior art) illustrates a thirty-two (32) state convolution encoder according to the preferred embodiment of the present invention.
Figure 13:
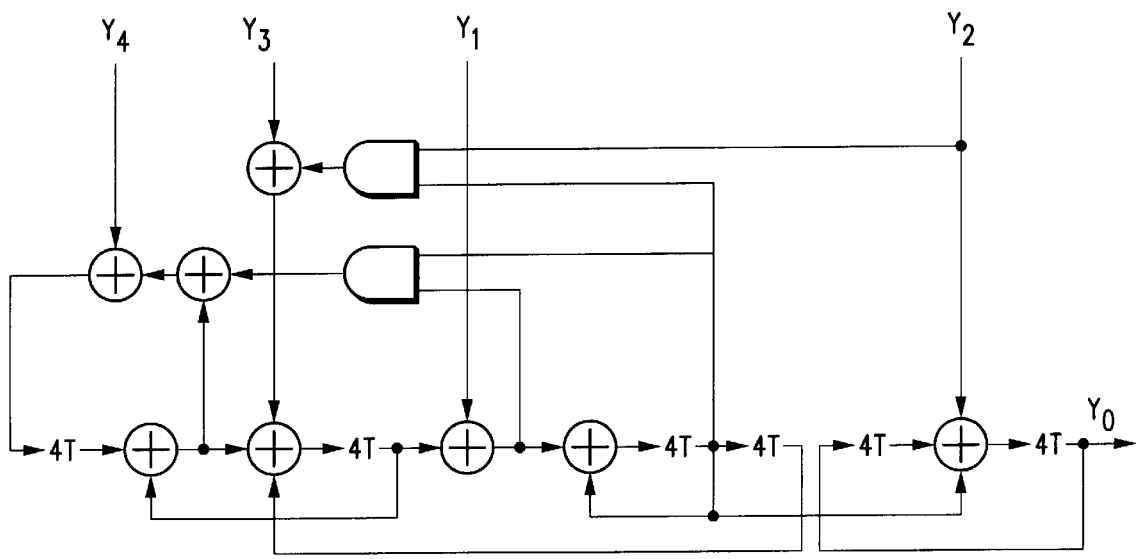
FIG. 13 (prior art) illustrates a sixty-four (64) state convolution encoder according to the preferred embodiment of the present invention.

The convolutional encoder does the same operation with that of a V.34 modem. The four input bits are fed into the convolutional encoder 205. The convolutional encoder 204 can be a sixteen (16) state rate—2/3, as shown in FIG. 11; a thirty-two (32) state rate—3/4, as shown in FIG. 12; or a sixty-four (64) state rate—4/5, as shown in FIG. 13. For the 32-state encoder, the input bit Y3 is not used. For the 16-state encoder, the input bits Y4 and Y3 are not used. The convolutional encoder 205 generates an output bit U0, which is called the redundancy bit. There is an inherent delay of one trellis frame interval in the convolutional encoder 205. As a result, the output bit U0 does not depend on the current input bits [Y4, Y3, Y2 and Y]. The output bit U0 is fed into the precoder 195 and replaces the previous U0 value previously inputted in the precoder 195. The current U0 value fed into the precoder 195 is used to calculate the next fourth precoder output (i.e., y(4k+3)) in the next four-dimensional symbol.

Thus, as stated above, the redundancy bit, U0, is generated for each set of four symbols. When the redundancy bit, U0, is equal to zero (0), y(n) is chosen from an even four-dimensional family; and when the redundancy bit, U0, is equal to one (1), y(n) is chosen from an odd four-dimensional family. Having redundancy prevents the precoder 195 from freely choosing a point on the constellation, and limits the precoder 195 to choosing a point on the constellation under the constraint imposed by the redundancy bit, U0, stated above. This increases the reliability in decoding the signal at the receiver.

The present invention, however, can be easily extended to other types of Trellis coding schemes, e.g. two-dimensional or six-dimensional Trellis coding schemes, where the redundancy bit, U0, would be generated for each set of two and six symbols, respectively. The present invention can also be easily extended to other types of PCM pre-coding, e.g., two-dimensional pre-coding.

It should be noted that the present invention might be embodied in software and/or firmware that may be stored on a computer useable medium, such as a computer disk or memory chip. The present invention may also take the form of a computer data signal embodied in a carrier wave, such as when the present invention is embodied in software/firmware that is electrically transmitted, for example, over the Internet.

The present invention may also be embodied in other specific forms without departing from the spirit or essential characteristics. The described embodiments are to be considered in all respects only as illustrative and not restrictive. The scope of the invention is, therefore, indicated by the appended claims rather than by the foregoing description. All changes, which come within the meaning and range within the equivalency of the claims, are to be embraced within their scope.

I claim:

1. A method for combining a Trellis coded system with a pre-coding scheme for data signals comprising:
   receiving input bits from a user;
   from the input bits, defining an equivalence class which has at least one constellation point, wherein one of the constellation points in the equivalence class is chosen to represent an output of a channel;
   calculating a redundancy bit from the output of the channel; and
   using the redundancy bit to define a next equivalence class.

2. The method according to claim 1 wherein the equivalence class is one-dimensional.

3. The method according to claim 2 wherein the equivalence class is based on a combination of the redundancy bit and a previous coded output.

4. The method according to claim 2, wherein subsequent equivalence classes are defined differently in different time slots based upon previous coded outputs.

5. The method according to claim 2 wherein the equivalence class is defined using the following equations:

$$\{yi(4k+i)\}=\{u(4k+i)+c^*M_i\}, \text{ where } i=0, 1 \text{ and } 2;$$

and $$\{yi(4k+3)\}=\{2u(4k+3)+2c^*M_3+((yi(4k)+yi(4k+1)+yi(4k+2)+U_0)\bmod 2)\}$$

where c is an integer and it is assumed that $0<=u(4k+i)<=M_i-1$.

6. The method according to claim 1 wherein the equivalence class is multi-dimensional.

7. The method according to claim 6 wherein the equivalence class is chosen from an even multi-dimensional family when the redundancy bit is equal to zero.

8. The method according to claim 6 wherein the equivalence class is chosen from an odd multi-dimensional family when the redundancy bit is equal to one.

9. An apparatus for combining a Trellis coded system with a pre-coding scheme for data signals comprising:
   a mapping scheme component for receiving input bits from a user and maps the input bits into multi-dimensional numbers;
   a parallel-to-serial port, coupled to the mapping scheme component, for receiving the multi-dimensional numbers in a parallel fashion and converting the multi-dimensional numbers into one-dimensional numbers outputted serially;
   a precoder, coupled to the parallel-to-serial port and a convolutional encoder, for receiving the one-dimensional numbers serially and defining an equivalence class which has at least one constellation point, wherein the precoder chooses one of the constellation points in the equivalence class to represent an output of a channel; and
   the convolutional encoder, coupled to the precoder, for calculating a redundancy bit from the output of the channel and feeding the redundancy bit into the precoder in order for the precoder to define a next equivalence class.

10. The apparatus according to claim 9 further comprising an inverse map component, coupled to the precoder, for receiving the output of the channel from the precoder and representing a plurality of states of the convolutional encoder, and wherein the convolutional encoder is coupled to the precoder via the inverse map component, and the redundancy bit is calculated based on the plurality of states.

11. The apparatus according to claim 9 wherein the equivalence class defined by the precoder is one-dimensional, wherein subsequent equivalence classes are defined in different ways in different time slots based upon previous coded outputs.

12. The apparatus according to claim 11 wherein the equivalence class is based on a combination of the redundancy bit and a previous coded output of the precoder.

13. The apparatus according to claim 11 wherein the equivalence class is defined using the following equations:

$$\{yi(4k+i)\}=\{u(4k+i)+c^*M_i\}, \text{ where } i=0, 1 \text{ and } 2;$$

and $$\{yi(4k+3)\}=\{2u(4k+3)+2c^*M_3+((yi(4k)+yi(4k+1)+yi(4k+2)+U_0)\bmod 2)\}$$

where c is an integer and it is assumed that $0<=u(4k+i)<=M_i-1$.

14. The apparatus according to claim 10 wherein the equivalence class defined by the precoder is multi-dimensional.

15. The apparatus according to claim 14 wherein the equivalence class is chosen from an even multi-dimensional family when the redundancy bit is equal to zero.

16. The apparatus according to claim 14 wherein the equivalence class is chosen from an odd multi-dimensional family when the redundancy bit is equal to one.

17. The apparatus according to claim 9 wherein the mapping scheme component is a modulus conversion component.

18. The apparatus according to claim 9 wherein the pre-coding scheme is one-dimensional and the Trellis coded system is four-dimensional.

19. A storage medium having stored thereon a set of instructions, which when loaded into a microprocessor causes the microprocessor to:

receive input bits from a user;

define an equivalence class which has at least one constellation point, wherein one of the constellation points in the equivalence class is chosen to represent an output of a channel;

calculate a redundancy bit from the output of the channel; and use the redundancy bit to define a next equivalence class, thus defining subsequent equivalence classes in different ways in different time slots based upon previous coded outputs.

* * * * *